June 5, 1956  M. DUBACH  2,748,951
DEVICE FOR SEPARATING SOLID PARTICLES FROM LIQUIDS
Filed May 1, 1952  3 Sheets-Sheet 1
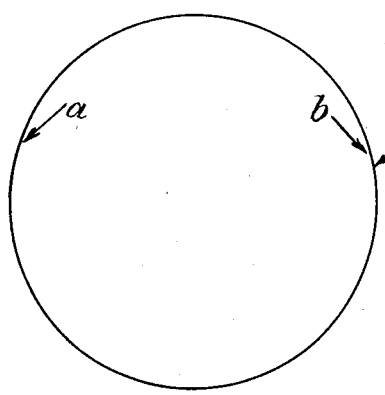
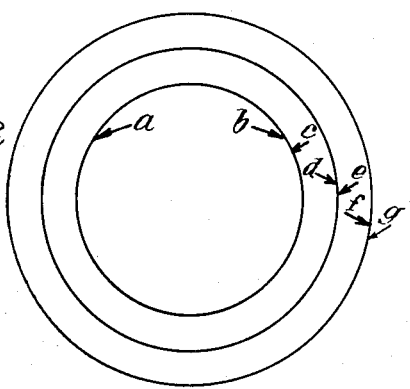
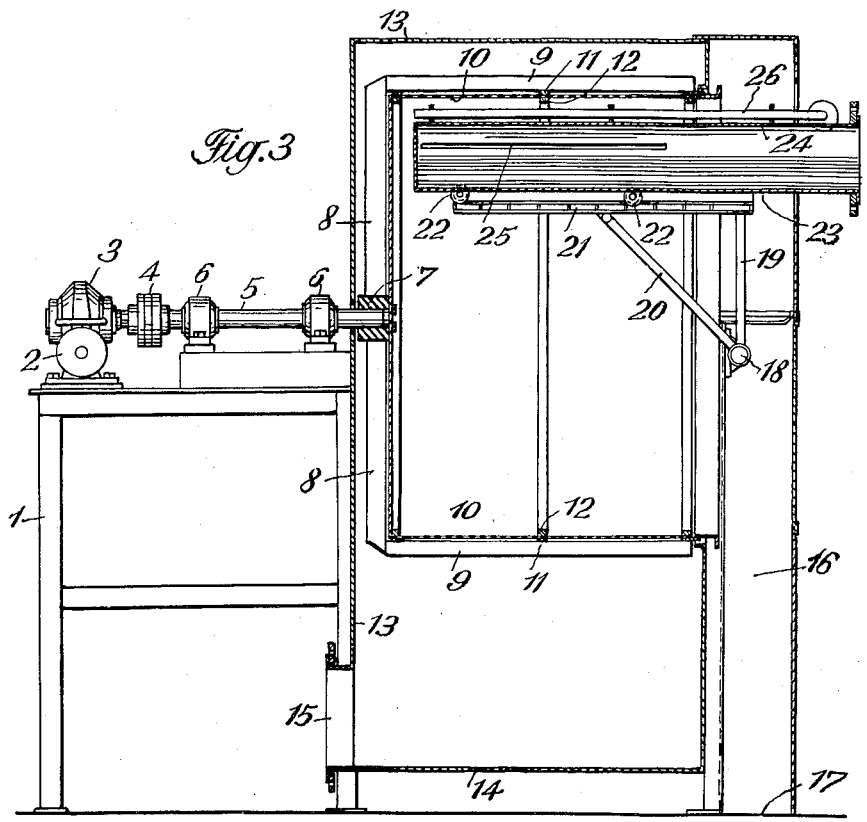
INVENTOR.
Max Dubach,
BY

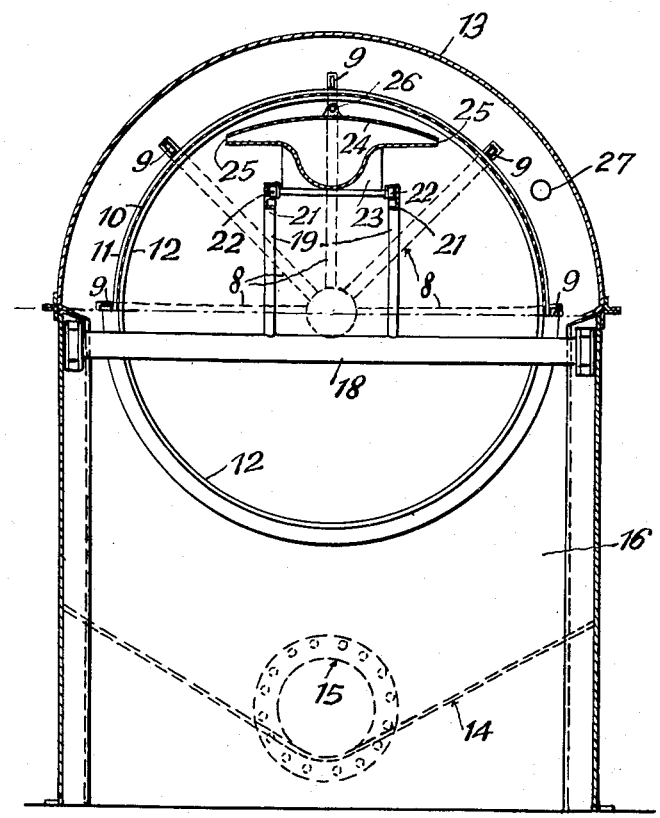

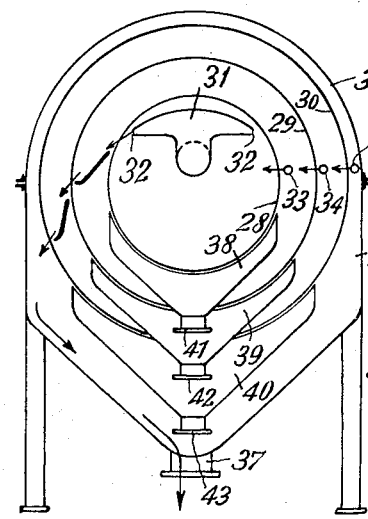
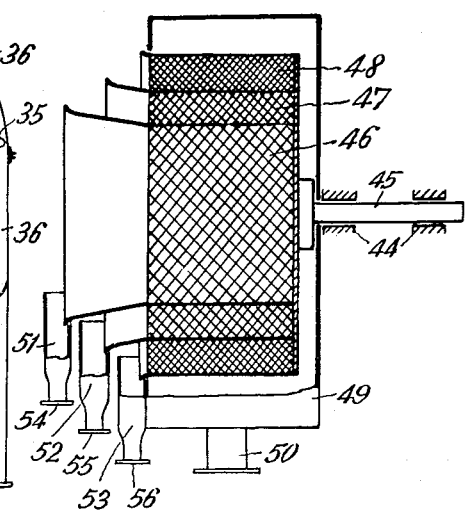
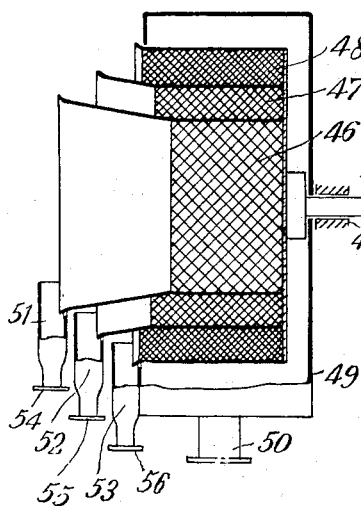
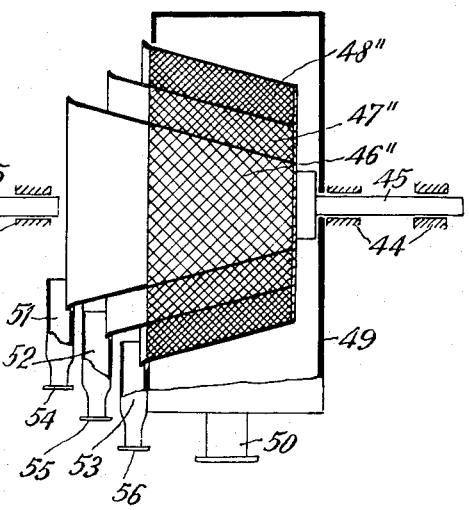

United States Patent Office 2,748,951
Patented June 5, 1956

2,748,951

DEVICE FOR SEPARATING SOLID PARTICLES FROM LIQUIDS

Max Dubach, Attisholz, Switzerland

Application May 1, 1952, Serial No. 285,357

Claims priority, application Switzerland May 4, 1951

1 Claim. (Cl. 210—199)

The present invention relates to a device for separating solid particles from liquids, particularly fibers from fiber containing liquids, for example from suspensions as are present in the cellulose and paper industry, for the purpose of concentrating or regaining the fibers or for cleaning industrial waters.

The usual apparatus employed for the filtration of fiber-containing liquids comprise rotary drum filters, vacuum filters, or endless travelling-band strainers. These devices for technical reasons are mostly provided with comparatively wide-meshed sieves or strainers. Therefore the proper filtration takes place only then, when the larger solid particles present in the suspension have formed upon the sieve a layer impervious to the subsequently following solid particles. In this case the sieve generally serves only as supporting means while the retained solid particles form the proper filtration film or layer. The solid particles retained upon the sieve are then in most cases removed from the sieve by means of an endless conveyor band or by special devices such as scrapers, remover rolls, etc.

The fact exists, however, that with an increasing amount of solid particles upon the sieve the perviousness of the filtration layer for the fluid part of the suspension decreases quite rapidly. When dipping a clean sieve into the suspension the filtration speed is very great, passing through the sieve first those solid particles which are smaller than the clear width of the mesh. However, as soon, as a layer impervious to the smaller particles becomes formed upon the sieve, the filtration output decreases very rapidly.

A further peculiarity of such known devices consists therein that the sieves are clogged up very soon, especially when fiber containing fluids of the cellulose and paper industry are filtered.

This clogging-up often causes a quite considerable decrease in the efficiency of the filter. For this reason the sieves must be frequently cleaned, or special cleaning devices must be provided, ensuring a permanently clean condition of the sieve.

These two circumstances, the formation of a layer of solid particles and the rapid clogging of the sieve both involve a great impairment of the efficiency of the filter. This results in a particular disadvantage when large amounts of liquid with a small amount of solid particles have to be worked with. In such a case usually extraordinary large filtration surfaces are required.

It is the object of the present invention to overcome all these shortcomings by a new and improved filtration method.

According to the invention, a special feature of the method comprises the use of a rotary filter drum, the mesh openings of which are adjusted with respect to the particle size of the retained material in such a way that only the desired particle size is retained and that the suspension to be separated on the inside of the drum on at least one place is led against the inner wall of the drum under a certain angle determined by the striking direction of the suspension and the tangent on the striking point, care being taken that the material striking upon the drum always meets a clean sieving surface and that the sieved solid particles leave the drum on the lower part of same. In order to prevent formation of the mentioned clogging-up and in order to obtain the desired high specific filtering efficiency, the deviation from a horizontal line of the direction under which the veil of liquid leaves the nozzles, should not exceed a predetermined angle.

Since the fiber containing suspensions present in the cellulose and paper industry mostly comprise a mixture of fibers of different kinds and other accompanying materials, which differ with respect to their particle size, it is often of importance to eliminate or to sort out of such a fiber containing suspensions greater or smaller particles. Frequently, for instance, branches, chips, bark particles, fiber bundles and other so-called rough stuff has to be separated from the proper fibers; or it is required to remove, for example, out of the fiber suspension, the resinous medullary cells from wood cellulose. In other cases it may be required to separate fiber suspensions in fractions with longer and shorter mean fiber length.

The separation of the solid particles suspendsd in the liquid according to particle size was so far carried out for instance by withdrawal of the long fibrous portions by means of special devices or by straining the suspension through sieves, consisting of perforated or slitted sheet metals or of sieving fabrics. The free opening of these sieves usually is so chosen that only solid particles of the desired size can pass. Such devices are employed in form of flat sieves as well as rotary or stationary sieving cylinders. In order to prevent the accumulation of a solid particle layer upon the sieve, impeding proper separation, a shaking or vibrating motion frequently is imparted to these devices, or the suspension is kept in constant motion by stirring or pulsation.

According to a modification of the present invention the sorting-out process can be effected when operating with several rotary filter drums arranged concentric around a common axle, which drums are arranged in such spaced relation that the liquid traversing the sieving jacket more adjacent to the drum axis opens into the inner side of the next following outer drum, wherein the drums with increasing distance from the drum axis possess decreasing passage openings and that the suspension to be separated is led towards the inner wall of the innermost drum at least on one place under a certain angle lying between 0° and 90°, which angle is determined by the striking direction of the suspension and the tangent at the striking point on the drum.

The present invention will now be described more fully with reference to the accompanying drawings illustrating, by way of example, several embodiments of the invention, and in which:

Fig. 1 diagrammatically illustrates the filtering operation performed with a single sieving drum;

Fig. 2 illustrates the operation with three concentric sieving drums;

Fig. 3 is a front elevation with partly vertical section through a device with a sieving drum;

Fig. 4 shows in the upper half a cross-section and in the lower half a side elevation to Fig. 3;

Fig. 5 is a diagrammatic side view of a device with three concentric sieving drums, and Figs. 6, 7 and 8 are diagrammatic axial sections of three modified embodiments each containing three sieving drums.

In Figs. 3 and 4 the numeral 1 designates a frame upon which an electromotor 2 is disposed driving by the intermediary of a gearing 3 and a coupling 4 a shaft 5 which is journalled in two bearings 6. A hub 7 is mounted on the shaft 5 and provided with spokes 8 each carrying on its outer end an axially extending rail 9. On the inner side of the rails 9 a sieving drum 10 is held in position by means of the rings 11, 12. The circumferential surface of the sieving drum 10 represents the filtration surface, consisting of sieving fabric, meshwork, or perforated or slotted sheet metal.

The sieving drum 10 is located in a frame 13 the bottom 14 of which is formed by two metal sheets converging obliquely towards the middle and leading to a discharge opening 15 for the liquids passing through the sieving drum 10. On the side of the frame 13 a collecting chamber 16 is provided for the solid particles retained in the interior of the drum. The collecting chamber 16 is provided below with a discharge 17.

On a rod 18 fastened to the frame 13, uprights 19, 20 are fixed, supporting two rails 21 upon which rolls 22 of a movable device 23 are guided. This device 23 is provided with a supply pipe 24 for the suspension, i. e. for the mixture of solid particles and liquid, to be filtrated. The portion of the supply pipe 24 lying in the interior of the drum 10 is provided with discharge nozzle openings 25 through which the suspension to be filtrated is led in the direction of the arrows $a$ and $b$ of Fig. 1 towards both sides of the inner, upper half of the sieving drum 10. Above the pipe 24 another smaller pipe 26 is disposed by means of which water can be squirted from the inside against the sieving drum 10. Through another pipe 27 (Fig. 4), moreover, water can be squirted from the outside in the direction of the arrow $c$ of Fig. 1.

The suspension to be filtrated is directed by means of the nozzle-openings 25 at a certain angle towards the inside of the rotating sieve drum 10. This angle is determined by the striking direction of the suspension and the tangent at the striking point on the sieve and may lie between 0° and 90°. The filtration of the suspension may be carried out along the whole sieving width of the drum 10 as well as only along a portion of same. The speed and the amount of the suspension streaming against the sieving area as well as the speed of rotation of the drum 10 are so chosen that the accompanying liquid can pass through the sieve, whereby the separation into solid particles and accompanying liquid takes place. In this manner the solid particles retained by the sieve collect in the lower portion of the drum 10 and drop out of same, as desired in more or less concentrated state into the collecting chamber 16. The size of mesh for the sieve to be employed depends on the properties of the material to be used and on the desired results.

The method according to the present invention purposely prevents the formation of a layer of solid particles upon the sieve, which decreases the filtration output by immediately discharging the retained solid particles from the filtration zone proper. In this case, therefore, the solid particles retained by the sieve do not serve as a filtration layer, but the sieve itself does all the filtering. By the method according to this invention, moreover soiling or clogging-up of the sieve is practically completely prevented and a very high filtering efficiency is assured.

In the embodiment illustrated in Fig. 5 three sieving drums 28, 29, 30 are arranged concentrically within each other. In the interior of the innermost sieving drum 28 a supply device 31 for the suspension to be filtrated or assorted is arranged. This device 31 may be formed and disposed similar to the device 23 in Fig. 3 and is provided with nozzle-shaped openings 32 by means of which the suspension to be filtrated is led towards the inside of the sieving drum 28 in the direction of the arrows $a$ and $b$ in Fig. 1. The striking angle is determined by the striking direction of the suspension and the tangent at the striking point on the sieve and may lie between 0° and 90°. The device may also be provided with a water pipe. Furthermore spray pipes 33, 34, 35 are provided by means of which clear water exempt of solid particles is squirted upon the outer side of the drums 28, 29, 30 in the direction of the arrows $c$, $e$, $g$ in Fig. 2. The distances between the sieving drums 28, 29 and 30 are such that the suspension traversing the drum 28 is directed against the drum 29 (arrow $d$ in Fig. 2) and the suspension traversing the drum 29 is directed against the drum 30 (arrow $f$ in Fig. 2). The outermost drum 30 is on its outside surrounded by a casing 36, into which the liquid having passed through all drums collects and flows out through a discharge 37. For each of the three drums 28, 29, 30 a catching funnel 38, 39, 40 is arranged laterally beneath the drum, into which the solid particles retained in the respective drums drop. The lower end of each funnel 38, 39, 40 is provided with a discharge opening 41, 42, 43.

The suspension to be filtered may be delivered to the sieve over the entire sieving breadth of the drum or only to a portion of same. The velocity and the amount of the suspension flowing upon the sieving area as well as the rotational speed of the drum are so chosen that the solid particles may pass through the respective sieve according to their size or may be retained by it. The solid particles retained by one or several of the sieves then gather in the lower part of the individual sieving jackets and drop out of them in a more or less thickened or concentrated condition.

According to Fig. 6 three cylindrical sieving drums 46, 47 and 48 of equal width are arranged on a rotatable shaft 45 journalled in bearings 44, which drums are surrounded by a housing 49 provided with a discharge 50. Catching funnels 51, 52 and 53 for the solid particles retained in the respective drums are provided for the corresponding drums. Each of the funnels 51, 52 and 53 has a discharge tap 54, 55 and 56, respectively.

Fig. 7 shows a modification of Fig. 6, which differs only from the previously described examples in that the three concentric sieving drums 46', 47' and 48' are of different width, the width increasing with the distance of the sieves from the axis of rotation.

Fig. 8 moreover shows a modified embodiment wherein the three sieving drums 46'', 47'' and 48'' are conically formed instead of cylindrically.

The described devices and the method in using same prevent the formation of a layer of solid particles upon the sieve impeding the separation and filtration, at the same time the necessary agitation of the suspension upon the sieve required for an efficient separating action is obtained. The solid particles retained by the sieves are immediately and in a careful manner removed from the proper separating zone. The device suitably may be used in the cellulose and paper industry as catcher of little branches and knots and for the sorting-out of chips, bark particles and fiber bundles. Furthermore the device may serve for the separation of fiber mixtures into fractions with various, mean fiber lengths, especially also for the removal of resinous medulla cells out of suspensions containing wood cellulose. The device may be used with only one sieving jacket for carrying out one of the mentioned working processes. The use of the device comprising several sieving jackets permits several working processes to be carried out in one operation, the size of mesh of the outermost sieving jacket for instance being so chosen that it may act as a filter.

What I claim is:

In an apparatus for separating solid particles from suspensions containing them, comprising a casing, a horizontal rotary filter drum mounted in said casing, means for rotating said drum, said drum being provided with passage openings adjusted to the particle size of the retained material, the combination of a distributor extending lengthwise in the upper third of said drum, slotted nozzle means on said distributor disposed closely adjacent the inner surface of said drum and adjacent the highest point of said drum for discharging the suspension to be filtered in a downwardly inclined continuous veil to strike against the inner surface of the drum at an angle closely approximating the tangent to such striking point so as to impinge upon a clean area and over at least three quarters of the breadth of the upper third of the inner surface of said drum, means for discharging the suspension under pressure through said nozzle means whereby the suspension flows downwardly along at least the lower two-thirds of the inner surface of the drum previous to the retained solid particles being evacuated from the bottom of the drum.

References Cited in the file of this patent

UNITED STATES PATENTS

| | | |
|---|---|---|
| 292,947 | Porter et al. | Feb. 5, 1884 |
| 897,144 | Priem | Aug. 25, 1908 |
| 1,000,540 | Neikirk | Aug. 15, 1911 |
| 1,206,401 | Bellinger | Nov. 28, 1916 |
| 1,712,258 | Compain | May 7, 1929 |
| 2,064,403 | Barker | Dec. 15, 1936 |
| 2,177,560 | Coogan et al. | Oct. 24, 1939 |
| 2,232,768 | Buddeburg | Feb. 25, 1941 |
| 2,321,243 | Range | June 8, 1943 |
| 2,416,499 | Saxe | Feb. 25, 1947 |
| 2,533,852 | Tretig | Dec. 12, 1950 |